July 26, 1949.    M. R. SPRINGS, JR    2,477,498
INSPECTION LIGHT AND ELECTROMAGNET COMBINATION
Filed Aug. 29, 1947
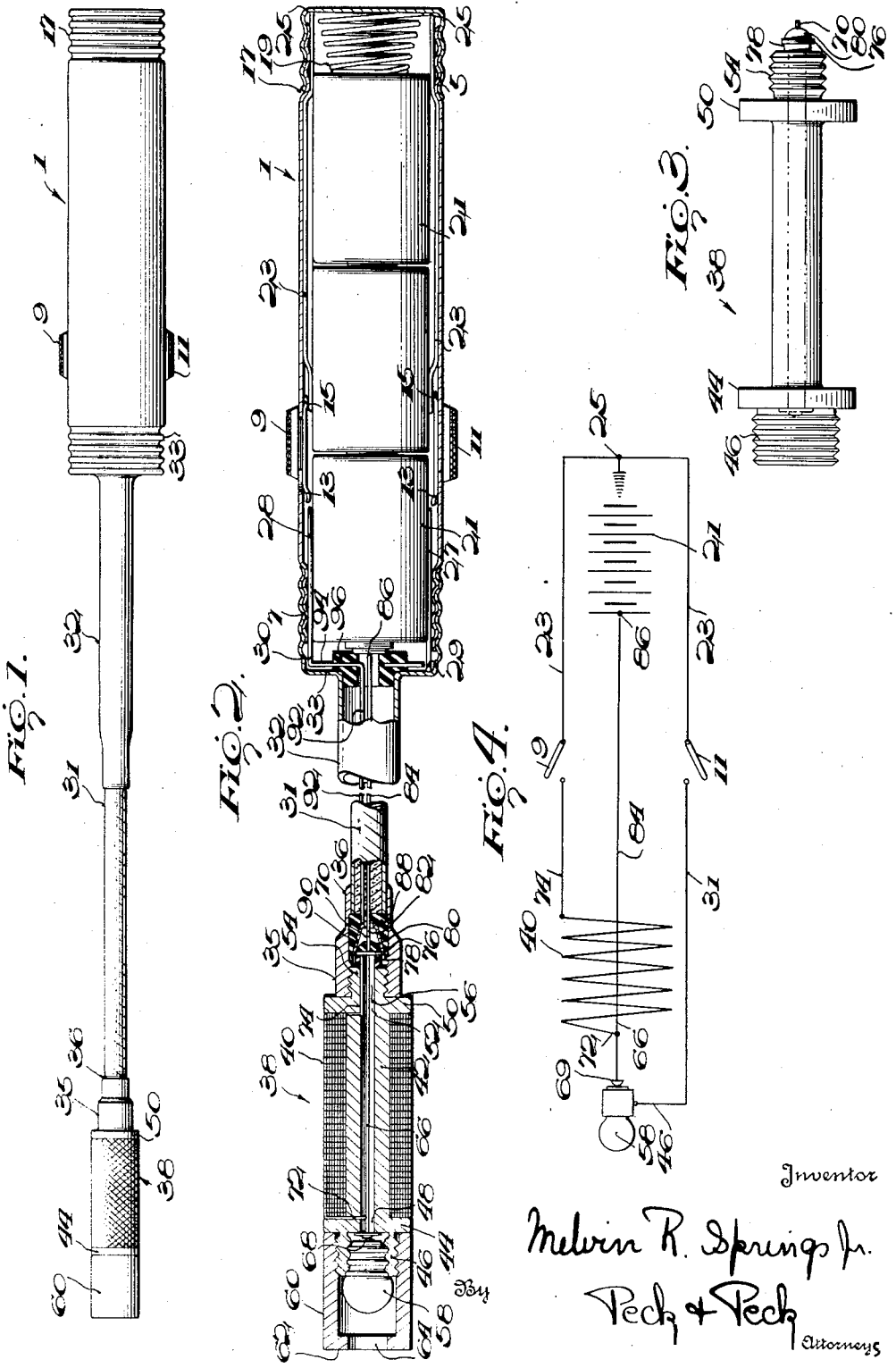
Inventor
Melvin R. Springs Jr.
Peck & Peck
Attorneys Patented July 26, 1949

2,477,498

UNITED STATES PATENT OFFICE 2,477,498

INSPECTION LIGHT AND ELECTROMAGNET COMBINATION

Melvin R. Springs, Jr., Mineola, N. Y.

Application August 29, 1947, Serial No. 771,244

4 Claims. (Cl. 171—97)

This invention relates broadly to the art of illumination, and in its more specific aspects it relates to a portable light provided with unique means whereby ferrous and the like objects in normally inaccessible areas may be illuminated and retrieved by this invention; and the nature and objects of the invention will be readily recognized and understood by those skilled in the arts to which it relates in the light of the following explanation and detailed description of the accompanying drawings illustrating what I at present believe to be the preferred embodiments and mechanical expressions of the invention from among various other forms, arrangements, combinations, and constructions, of which the invention is capable within the spirit and scope thereof.

It is highly desirable and of great advantage to be able to pick up or retrieve, as well as see small objects which have been dropped down or otherwise disposed in dark corners, or other hard to get at and inaccessible places, and it is therefore a fundamental object of my invention to provide in one implement an illuminating means and a retrieving means.

A further characteristic of my invention resides in the provision in one implement of an electric illuminating and retrieving means wherein the controls for each are separate.

Another object of my invention is to provide a unitary electric illuminating and retrieving means in which the retrieving means comprises an electromagnet operable from the same source of power as the illuminating means but separately controlled.

It is also a purpose of my invention to provide in one implement an electric illuminating device and an electromagnet retrieving device, which implement may be used solely as an illuminating device or solely as a retrieving device, or may be manipulated to function simultaneously as an illuminating and retrieving device.

A further purpose of my invention is embodied in the provision of magnetizable means adjacent the electric illuminating bulb which serves the dual function of protecting the bulb from damage when it is projected into inaccessible places and also serves to attract ferrous objects which are sought.

My invention has also been devised with the object in mind of facilitating the picking up or retrieving of articles in difficult to get at places and I have therefore constructed the implement so that the illuminating and retrieving means may assume various angular positions relative to the handle of the implement and are spaced therefrom.

Another object of my invention is to provide a simple electric circuit for the illuminating device and the retrieving device.

It is also a purpose of my invention to provide an implement of this character which is sturdy and compact, easy to use and economical to manufacture.

Another object of this invention is to form the implement in such manner that the parts are detachable for replacement and repair.

And yet a further object of my invention is to provide an implement of this character in which the electric bulb is easily accessible for removal and replacement.

With the foregoing general objects, features, and results in view, as well as certain others which will be apparent from the following explanation, the invention consists in certain novel features and designs, construction, mounting and combination of elements, as will be more fully and particularly referred to and specified hereinafter.

Referring to the accompanying drawings:

Fig. 1 is a plan view of the inspection light and electromagnet combination.

Fig. 2 is a sectional view with parts thereof broken away.

Fig. 3 is a plan view of the electromagnet detached from the implement.

Fig. 4 is a diagrammatic view showing the electric circuit employed in the implement.

In the accompanying drawings, wherein one embodiment of my invention has been illustrated, I have used the numeral 1 to designate in its entirety the battery case or tubular housing of the implement, which housing also functions as the handle therefor. The housing 1 is preferably though not necessarily, formed of plastic, molded fiber or the like, which may be a non-conductor of electricity, and the housing is stamped or otherwise provided with threaded ends 5 and 7 for a purpose to be hereinafter described. A pair of sliding switch buttons 9 and 11 are operatively associated with the housing for sliding circuit making and breaking positions, the switch buttons having contact elements 13 and 15 at the forward and rear ends thereof, respectively, such contact elements extending into the casing. The switch 9 controls an electromagnet circuit, while switch 11 controls an electric light circuit.

The rear end of the casing is closed by a metallic cap 17 adapted to be screwed on the threaded end 5 of the housing, the cap 17 being provided with the usual metallic compression spring means 19 which is adapted to engage one of a plurality of batteries 21 which are housed within the casing and which supply the implement with power. This particular construction is conventional in the flashlight art and it will be evident that the spring 19 maintains the series of batteries in electrical contact with each other.

Secured in any suitable manner on the interior of the casing are a pair of current conducting strips 23 which extend from a position adjacent to and in contact with the contact elements 15 which are carried on the switches 9 and 11, to a rear position in contact with cap 17 as at 25. A further current conducting strip 27 which, as will hereinafter be explained, forms part of the ground line for the light circuit, is secured to the casing in any desirable manner and is of a length to extend a distance beyond the end of threaded portion 7 of the casing as at 29, and its opposite end is positioned forwardly of contact element 13 when switch 11 is in retracted or circuit breaking position. The ground line for the magnet circuit includes a current conducting strip 28 which extends forwardly from a point in advance of contact element 13 of switch 9 to a point in advance of or beyond threaded section 7 of the casing, the forward end of strip 28 being designated by numeral 30.

It will be appreciated that a strip 23 and strips 27 and 28 are provided for each switch, and that these strips are so positioned that in open circuit, switch retracted position contact elements 15 are not in contact with strips 27 and 28, but in closed circuit switch projected position they are in contact with strips 27 and 28. And it will further be recognized that contact elements 15 are in contact with strips 23 in all switch positions.

My inspection light and electromagnet combination includes as a separable part thereof, a length of flexible metallic cable 31 which is fixed at one end within a substantially rigid metallic tubular member 32. Tubular member 32 and cable 31 may be fastened together in any suitable manner so that the interiors are in substantial alignment. The tubular member is provided at the rear end thereof with an enlarged cap 33 which is threaded and in operative position is adapted to be removably screwed on threaded end 7 of the casing. When cap 33 is screwed on the casing as described, it is in contact with the forward end of conducting strip 27 as at 29. At the opposite or forward end of the flexible cable 31, I provide an enlarged internally threaded ferrule or the like element 35. Element 35 is of sleeve-like formation and extends rearwardly as at 36 in contact with the flexible cable and fixed thereto in any desirable and convenient manner.

My invention includes a further separable section which provides the retrieving means of the invention. This retrieving means includes an electromagnet designated generally by the numeral 38, the electromagnet including the usual winding 40 and the core 42, the core preferably though not necessarily being of tubular construction for receiving therethrough a current carrying cable or wires as will be hereinafter explained. The core includes at the forward end thereof, a collar 44 and a forwardly projecting interiorly and exteriorly threaded socket 46; the collar 44 having an aperture 48 therein aligned with the opening through the major portion of the core. The core 42 is formed with a further collar 50 adjacent the rear end thereof, this collar likewise having an aperture 52 extending therethrough in alignment with the opening in the major portion of the core. An exteriorly threaded nipple 54 extends from the rear end of the core and is provided with an axial opening 56 in alignment with the opening in the major portion of the core. The openings in the major portion of the core, the apertures 48, 50, and 56 are, as will be evident, all in alignment. The socket 46 is adapted to receive the usual relatively small incandescent light bulb 58.

An open ended cylindrical shield 60 of ferrous metal is provided and is threadedly attachable to the socket 46, and when in position thereon surrounds and protects the electric light bulb 58. The shield 60 is screwed on socket 46 until it is in electric contact with the collar 44 of the core 42 of the electromagnet and will thus be magnetized when the electromagnet is energized. The shield 60 at its forward outer end is provided with an inwardly directed flange or operating surface 62, which in this particular embodiment of my invention is of annular configuration. The flange 62 is of such dimensions that an aperture 64 is provided in the outer end of the shield for permitting the light from the electric bulb to project beyond and forwardly of the implement.

Extending through the aligned openings in the electromagnet is an insulated current conducting wire 66 which, as I shall explain, is the positive line for both the magnet and the light circuits, the wire 66 being provided at the forward end thereof with a contact point 68 which is in electric contact with the contact on the electric light bulb. At its opposite or rearward end wire 66 is provided with a further enlarged electric contact 70. A positive lead 72 for the electromagnet is taken off positive wire 66, and at the other end of the electromagnet winding, a ground 74 extends through nipple 54 into electric contact with a disk 76 which is insulated from the nipple and contact 70 by means of insulation plugs or elements 78 and 80. This assembly of insulating elements and contact disk may be maintained on the nipple by forming contact 70 large enough to provide a head-like knob. Contact 70 of positive wire 66 is in electric contact with the forward exposed end 82 of insulated wire 84 which extends through flexible cable 31 and tubular element 32 and at its rear end 86 is in contact with the lead battery of the group of batteries carried in the casing.

A plug of insulating material 88 surrounds a metallic contact member 90 of conical shape which is in electric contact with contact disk 76, and an insulated wire 92 forming part of the ground line of the magnet circuit is in electric contact with said conical contact member 90, wire 92 extending through the flexible cable 31 and tubular member 32. Ground wire 92 at its rearward end is in electric contact with a metallic disk 94 having a central opening therein, disk 94 being carried in an insulating washer or gasket 96 having a central opening therein, the insulating gasket being fixed to the tubular member 32. The end of conducting strip 28 is in electric contact with disk 94 as at 30. It will be appreciated that I may form disk 94 and strip 28 integrally or they may be separate elements.

It will be recognized that I have provided an inspection light and electromagnet combination in which the magnet and the light are spaced a substantial distance from the handle or housing and that flexible means is interposed between the housing and the light so that the operating end of the implement may be easily projected into inaccessible areas at various angles relative to the housing. I have constructed this implement in sections, that is, the major operating elements are separable one from the other to facilitate their removal for replacement and repair. The magnetic member has been disposed closely adjacent the light for facilitating the retrieving of articles and for protecting the fragile light bulb, and the magnetic member is removable so that a worn out bulb may be removed and a new bulb inserted.

As hereinabove pointed out, I have provided an electric circuit and circuit controlling means for the implement whereby the light may be energized without the electromagnet, or the electromagnet may be energized without the light, or there may be simultaneous energization of both. The switch 9 controls the electromagnet in the following manner and through the following circuit. The user of the implement desiring to retrieve an article of ferrous material slides switch 9 forwardly whereupon contact element 13 makes electric contact with connecting strip 28 and current flows from the batteries through contact 86 which is in contact with the lead battery, positive wire 84, contacts 82 and 70, through wire 66 and 72 to the winding 40 of electromagnet, through the winding and through wire 74, disk 76, contact element 90, ground wire 92, disk 94 and conducting strip 28, contacts 13 and 15 and strip 23 and is grounded at 25 to complete the circuit and energize the electromagnet thereby magnetizing shield 60. Thus, the forward end of the implement including shield 60 may be projected into hard to get at places, at various angles relative to the casing, due to the flexible cable, and ferrous articles may be retrieved.

To light the bulb, the switch 11 is moved forwardly and the bulb circuit closed in the same manner as described in connection with switch 9, and current flows from the batteries through wire 84, contacts 82 and 70, wire 66 to contact 68 and the bulb contact through the bulb, and socket 46 then the collar 44, core 42, collar 50 through 54 and 35 to the flexible cable 31 and tubular element 32 through conducting strip 27 and the switch elements and to ground 25 through conducting strip 23. It will be recognized that the same positive wire is used for both the electromagnet and the bulb circuits.

It is to be distinctly understood that various types of battery housings may be used and also various circuit and switch arrangements within the housing without departing from the spirit and scope of my invention.

I claim:
1. An electromagnet and inspection light, including a casing for batteries, a flexible member attached thereto and projecting therefrom and carrying an electromagnet on the end thereof, the electromagnet provided with a socket and an electric light bulb disposed therein, a removable shield of magnetizable material attached to said electromagnet in contact with the core thereof and surrounding said bulb, and an electric circuit connecting said bulb and electromagnet with said batteries.

2. An electromagnet and inspection light, including a casing for a source of electric energy, a flexible member attached thereto and projecting therefrom and carrying an electromagnet on the end thereof, the electromagnet provided with a socket for receiving an electric light bulb, a removable shield of magnetizable material attached to said electromagnet in contact with the core thereof, and projecting beyond the walls of the socket, the shield having an aperture therein in substantial alignment with the socket for permitting light from a bulb to project therethrough, and an electric circuit connecting said electromagnet and the source of electric energy.

3. An electromagnet and inspection light, including a casing for a source of electric energy, a flexible member attached thereto and projecting therefrom and carrying an electromagnet on the end thereof, the electromagnet provided with a socket for receiving an electric light bulb, a removable shield of magnetizable material attached to said electromagnet in contact with the core thereof and projecting beyond the walls of the socket, the shield having an aperture therein in alignment with the socket and a substantially flat operating surface defining the aperture, and an electric circuit connecting said electromagnet and the source of electric energy.

4. An electromagnet and inspection light, including a casing for batteries, a flexible member removably attached at one end to one end of said casing, an electromagnet having a threaded nipple at one end for attachment to said flexible member, and provided with a socket at the other end, the walls of the socket projecting beyond the major portion of the electromagnet, an electric light bulb disposed in the socket and a magnetizable shield removably carried on and projecting from the walls of the socket and surrounding said electric light bulb and in contact with said electromagnet, and an electric circuit connecting said illuminating element and said electromagnet with said batteries.

MELVIN R. SPRINGS, Jr.

REFERENCES CITED

The following references are of record in the file of this patent:

UNITED STATES PATENTS

| Number | Name | Date |
|---|---|---|
| 644,860 | Hubert | Mar. 6, 1900 |
| 1,232,824 | Mayhen | July 10, 1917 |
| 1,842,471 | Eliasoff | Jan. 26, 1932 |

FOREIGN PATENTS

| Number | Country | Date |
|---|---|---|
| 218,193 | Great Britain | July 3, 1924 |